Figure 1:
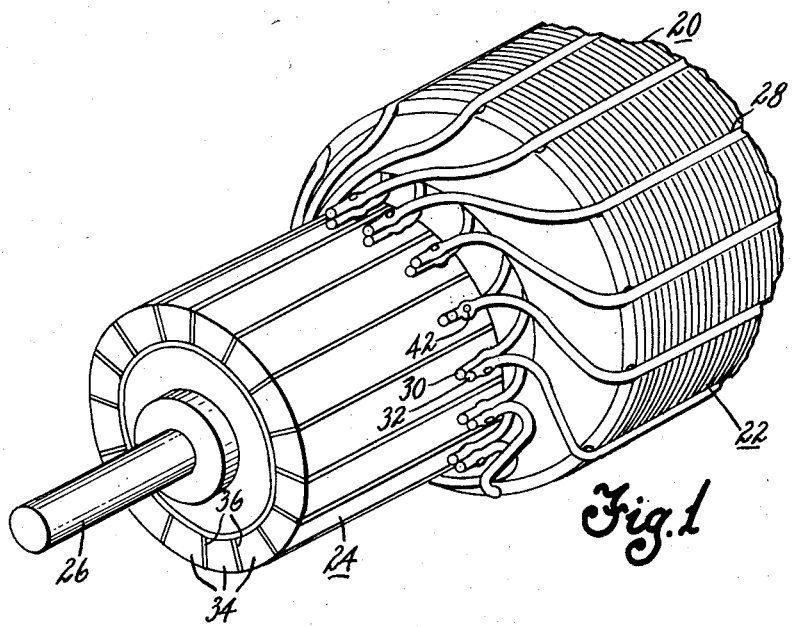

July 22, 1958  K. P. SHETTERLY  2,844,749
DYNAMO ELECTRIC MACHINE COMMUTATOR CONNECTION
Filed July 13, 1955

INVENTOR.
KARL P. SHETTERLY
BY
HIS ATTORNEY

United States Patent Office 2,844,749
Patented July 22, 1958

2,844,749

DYNAMO ELECTRIC MACHINE COMMUTATOR CONNECTION

Karl P. Shetterly, Anderson, Ind., assignor to General Motors Corporation, Detroit, Mich., a corporation of Delaware Application July 13, 1955, Serial No. 521,793

11 Claims. (Cl. 310—234)

This invention relates to dynamo electric machines and is particularly concerned with the connection of the armature coil windings with the commutator.

Heretofore numerous systems have been employed to connect the lead ends of the coil windings of the armature to the commutator segments. These attempts have generally utilized hooks on the commutator, slots in the commutator wherein the ends of the leads are staked, or risers which were positioned between the segments of the commutator which were bent over to engage the lead ends. This invention is directed to a new and novel connection between the lead ends of the coil windings of the armature and the commutator. The connection, according to the present invention, is accomplished by driving a separate fastener by means of impact into the material of the commutator so that a firm and tight connection will be formed between the lead ends and the commutator after the fastener is applied.

It is an object, therefore, of the present invention to secure the lead ends of the windings of an armature to the commutator with a separate fastener that is partially embedded in the material of the commutator by impact.

Another object of the present invention is to secure the lead ends of the windings of an armature to the commutator segments by driving a separate fastener through the diametric centers of the wire and partly into the material of the commutator which forms the segments.

A further object of the present invention is to form a connection between the lead ends of the wire coil windings of an armature and a commutator by a method which includes superimposing at least two leads of the coil windings upon each other on a segment of a commutator and nailing the lead ends to the commutator segment with a pointed fastener which pierces the superimposed wires and is partly embedded in the material of the segment when the fastener is driven by impact through the wires and into the segment.

In carrying out the above objects, it is a further object of the present invention to provide an improved connection between the ends of lead wires which have been secured to the segments of the commutator by a separate fastener that is driven partly into the material of the commutator by impact by soldering the secured ends of the lead wires to the commutator.

Further objects and advantages of the present invention will be apparent from the following description, reference being had to the accompanying drawings wherein preferred embodiments of the present invention are clearly shown.

In the drawings:

Figure 1 shows, in perspective, a portion of a commutator assembly wherein the lead ends of the coil windings of the armature are connected to a commutator according to the present invention.

Figure 2:
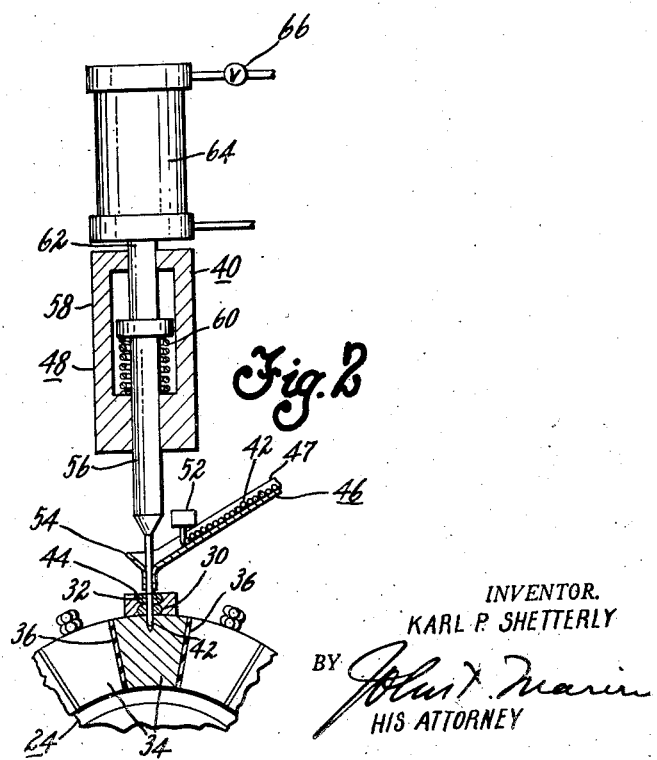

Figure 2 diagrammatically shows an apparatus for applying the fasteners for securing the lead ends of the armature coil windings to a segment of a commutator.

In the drawings, the numeral 20 is used to designate an armature assembly which has a laminated armature core 22 and a commutator assembly 24 mounted on a common shaft 26. The armature assembly 22 is preferably formed in the conventional manner of a plurality of laminated plates which are stacked and arranged to provide slots 28 wherein coils of wire may be wound. These coils of wire, which are generally wound a predetermined number of times in a predetermined slot, as determined by the electrical characteristics of the dynamo electric machine, have lead ends 30 and 32 which are secured to the segments 34 of the commutator assembly 24. The present invention is directed to the connection between the lead ends 30 and 32 and segments 34 of the commutator.

The commutator assembly 24 is usually constructed of a plurality of keystone segments 34 which are arranged to form an annulus. The individual segments 34 are insulated from each other by a suitable barrier 36 of insulating material such as mica.

In Figure 2 of the drawings, an apparatus 40 is diagrammatically shown which is adapted to cause a fastening means 42 to be driven through the individual leads 30 and 32 into the material, usually copper, which forms the segments 34 of commutator 24. The apparatus 40 includes a positioning means 44, a feeder and guide means 46 for the fasteners 42 and a means 48 which is adapted to apply an impact force to the fastening means 42. The positioning means 44 is constructed to hold the lead ends 30 and 32 in superimposed or stacked position on the commutator segment 34. The feeder and guide means 46 includes; a feeder trough 47, which serves as a supply for the fastening means 42, a guide trough 54 and a stop or dam means 52 which permits the fastening means 42 to be supplied one at a time into the guide trough 54. The impact applying means 40 includes a ram 56 which is suitably guided in a support 58 and urged by a spring 60 into engagement with the piston rod 62 of the air cylinder 64 which is controlled by valve 66.

After the armature assembly 22 has been wound with coils of wire, the ends of these coils 30 and 32 are positioned by the positioning means 44 on the proper commutator segment 34. The dam 52 then permits one of the fastening means to drop into the vertical position and be there held by the guide trough 54 so that the pointed end of the fastening means rests upon the diametric center of the lead ends 30 and 32. When the parts are in this position, air or fluid is permitted to rapidly enter cylinder 64 through control valve 66 and force the piston 62 downwardly with a sudden impact through ram 56 to the fastening means 42. The impact of ram 66 will cause the fastening means 42 to be driven through the diametric center of leads 30 and 32 and cause the fastening means 42 to be partially embedded into the material of the commutator segment 34. After this connection is formed, the operation is repeated on each pair of the coil winding leads until all of the leads are connected to the proper commutator segments. It is also apparent that the wires, when they are placed in position on the commutator segments, are normally round and the impact of the ram 56 upon the wires will cause them to be slightly flattened. This flattened surface will provide a greater contacting area between the wires and the commutator segment so as to improve the electrical connection therebetween. In this connection, it is to be noted that the wires, when fastened to the commutator as heretofore set forth, will be held in position throughout the normal range of operation of the dynamo electric machine wherein the armature assembly 20 is positioned. In some instances, it may be desirable to improve both the electrical and mechanical connections between the wire leads 30 and 32 and commutator segment 34. This may be accomplished by applying solder to the fastened leads in accordance with the well known conventional practices.

It is to be appreciated that the wires and commutator segments of the armature are usually made of copper. When this material is used, the copper wire may be securely fastened to the copper commutator if a harder material such as steel wire segments or needles are used. Thus, the material used for the fastening devices preferably is harder than the materials of the wires and segments and must have sufficient impact resistance to withstand the forces employed to drive the fastener into the proper position. The shape of the fastener also may be modified without departing from the scope of the present invention, i. e., the fastener could be formed as a staple which has its mid-portion embracing the wire ends and the end portions thereof embedded in the material of the commutator or the fastener may have barbs thereon to improve the anchorage in the commutaator segment.

While the embodiments of the present invention as herein disclosed, constitute preferred forms, it is to be understood that other forms might be adopted.

What is claimed is as follows:

1. In an armature for a dynamo electric machine, having a commutator formed at least in part of electrically conductive material and a slotted armature core with wire windings thereon, a means for connecting the lead ends of the wire core windings to the commutator comprising; a separate fastener having portions thereof in contact with portions of said wire and other portions thereof impaled in said commutator.

2. In an armature for a dynamo electric machine, having a metal commutator and a slotted armature core with metal wire windings thereon, a means for connecting the lead ends of the wire core windings to the commutator comprising; a separate fastening means piercing the metal material of said leads and impaled in the metal material of said commutator.

3. In an armature for a dynamo electric machine, having a communtator and a slotted armature core with wire windings thereon, a means for connecting the lead ends of the wire core windings to the commutator comprising; a separate metal piercing means extending through the diametric center of said wire leads and impaled partially in said commutator.

4. In an armature for a dynamo electric machine having a metal segmented commutator and a slotted core with wire core windings having lead ends juxtaposed on the segments of said commutator, a means for securing the ends of said windings to said segments comprising; a nail-like member formed of metal material piercing both the lead ends of said wire ends and the material of said segment, said nail-like member being formed of harder metal material than the metal material of said commutator.

5. In an armature for a dynamo electric machine having a segmented metal commutator and a slotted armature core with wire windings in said slots wound to form individual coils with each having the wire ends thereof extending and arranged to have at least two lead ends juxtaposed on a peripheral edge of a predetermined commutator segment, means for securing the ends of said wires to said segments when selected wire ends are superimposed upon one another on a selected commutator segment, comprising a separate fastening means extending through said wires and impaled in the metal material of said segment.

6. In an armature for a dynamo electric machine having a segmented commutator formed of electrically conducting material and a slotted armature core with wire wound to form individual coils each having the selected wire leads stacked in register with a selected commutator segment, a means for securing said ends to said segment comprising; a lance-like member piercing both the diametric center of said stacked wires and the material of the segment whereon said wire ends are stacked.

7. In a method of attaching the ends of individual coil leads of an armature winding to the solid metal segments of a commutator, the steps comprising; positioning a selected lead of the coils on a segment of a commutator, and driving a fastener into the solid metal material of said segment so that at least a portion of the fastener is impaled in the material of the segments while other portions thereof are in engagement with the material of said wire which forms a lead of said coil.

8. In a method of securing the lead ends of armature coil windings to a segment of a commutator, the steps comprising; stacking selected lead ends of at least two coils on one of the segments of the commutator, and driving a fastener by means of impact through the material of said leads at least partially into the material of said segment so that the fastener is impaled in the material of said leads and segment for holding said leads in stacked relation to said segment.

9. In a method of securing the lead ends of metal wire armature coil windings to a metal segment of a commutator, the steps comprising; stacking selected lead ends of at least two coils on one of the segments of the commutator, and driving a lance-like member by means of impact through the metal of said leads partially into the metal of said segment so that the fastener is impaled in the metal material of said leads and said segment for holding said leads in stacked relation on said segment.

10. In a method of securing the lead ends of armature coil windings to a metallic segment of a commutator, the steps comprising stacking selected leads of at least two metal wire coils on one of the segments of the commutator, driving a separate fastener by impact only through the metallic material of said wire which forms said leads at least partly into metallic material of said segment for holding said leads in position on said segment, and soldering said fastener to said leads and said leads to said segment for forming a mechanically strong and electrically tight connection therebetween.

11. In a method of securing the lead of a coil winding of an armature core to the commutator of a dynamo electric machine, the steps comprising; moving a lead end of a coil winding into position on said commutator, maintaining said position while driving a fastener through the material of said lead and at least partly into the material of said commutator for securely holding said lead on said commutator.

References Cited in the file of this patent

UNITED STATES PATENTS

| | | |
|---|---|---|
| 516,853 | Turner | Mar. 20, 1894 |
| 587,868 | Short | Aug. 10, 1897 |
| 784,521 | Feldkamp | Mar. 7, 1905 |
| 834,690 | Sturdevant | Oct. 30, 1906 |
| 1,747,268 | Sutherland | Feb. 18, 1930 |
| 1,848,142 | Pierce | Mar. 8, 1932 |
| 2,136,814 | Flynn | Nov. 15, 1938 |
| 2,175,251 | Carson | Oct. 10, 1939 |
| 2,389,255 | Graham | Nov. 20, 1945 |
| 2,447,718 | Simpson | Aug. 24, 1948 |
| 2,501,348 | Myers | Mar. 21, 1950 |
| 2,572,956 | Servis | Oct. 30, 1951 |
| 2,680,145 | Lanfear | June 1, 1954 |

FOREIGN PATENTS

| | | |
|---|---|---|
| 410,106 | Italy | Mar. 22, 1945 |